United States Patent [19]

Koch

[11] 4,312,223
[45] Jan. 26, 1982

[54] CARRIER SYSTEM FOR POSITIONING SENSORS ADJACENT A WIRE ROPE

[75] Inventor: Christopher E. Koch, Sacramento, Calif.

[73] Assignee: Exploration Logging, Inc., Sacramento, Calif.

[21] Appl. No.: 167,785

[22] Filed: Jul. 11, 1980

[51] Int. Cl.³ ............................................. E21B 47/04
[52] U.S. Cl. ...................................... 73/151; 324/206
[58] Field of Search ............ 73/151; 33/141 R, 141.5; 242/49; 254/270; 324/206

[56] References Cited

U.S. PATENT DOCUMENTS

| | | | |
|---|---|---|---|
| 2,466,251 | 4/1949 | Martin | 324/206 |
| 3,643,504 | 2/1972 | Rundell | 73/151.5 |

*Primary Examiner*—S. Clement Swisher
*Attorney, Agent, or Firm*—Christie, Parker & Hale

[57] ABSTRACT

In an apparatus for measuring depth of equipment in a well, a carrier system is provided on a well rig for positioning sensors adjacent a spiral wound wire rope which moves the equipment upwardly or downwardly. The carrier system employs a housing having rollers that engage the wire rope at two spaced locations. The sensors are located in the housing between the rollers, and they are maintained substantially equidistant from the wire rope by the action of the rollers so that they respond to movement of the spiral windings of the wire rope. A suspension system has arms that support the housing with reference to the rig, and the effective length of the arms is adjusted to compensate for errors in measurement that would be caused by lateral movement of the wire rope along a drum that actuates the wire rope.

12 Claims, 11 Drawing Figures

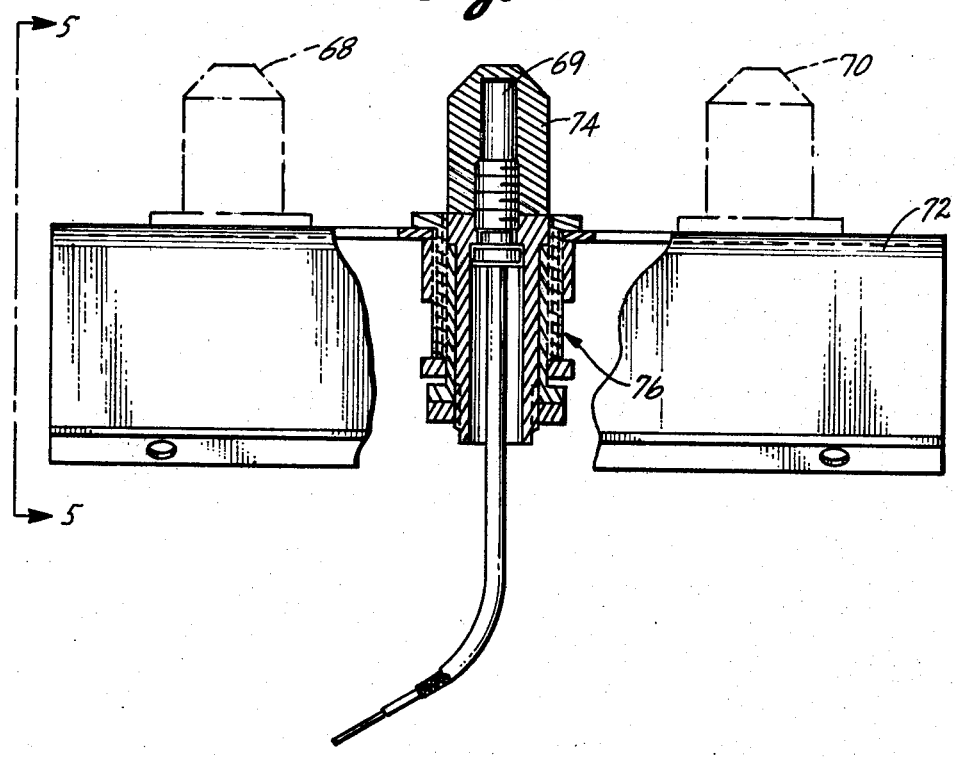
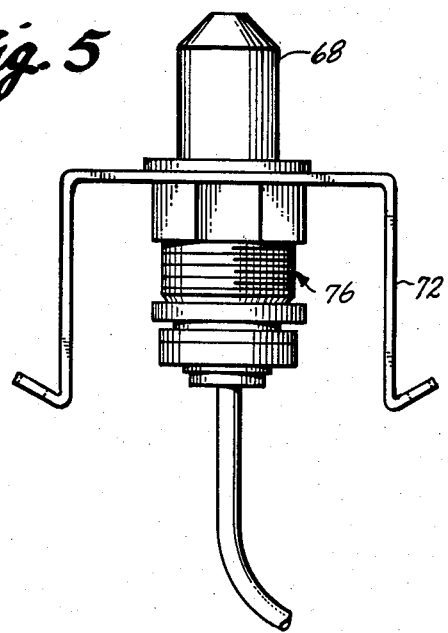

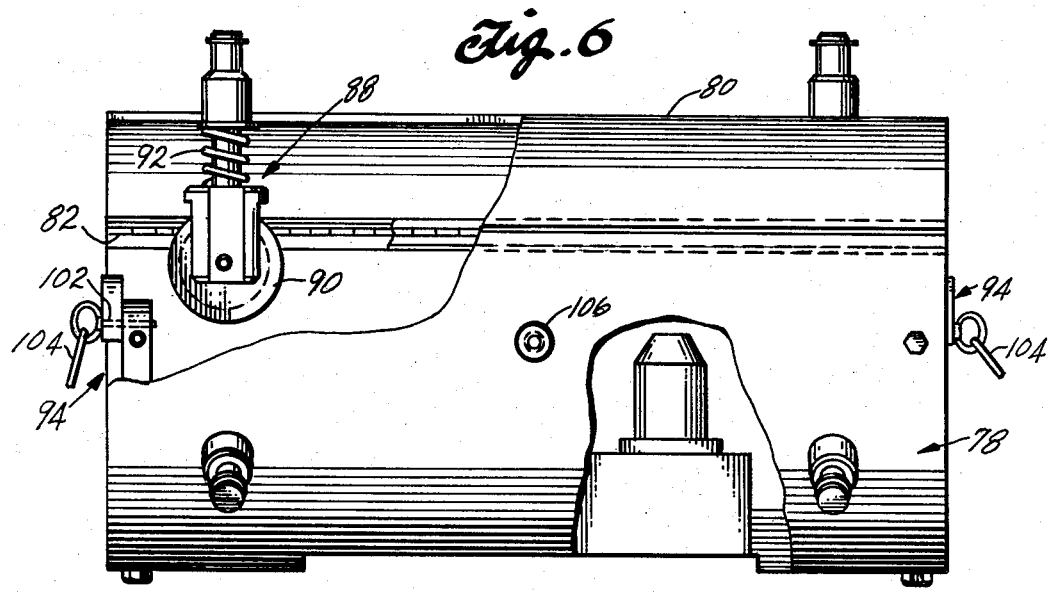
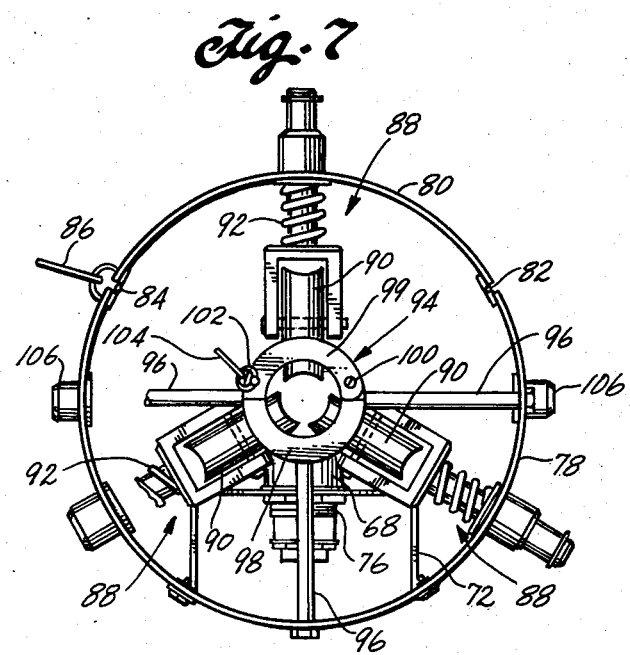

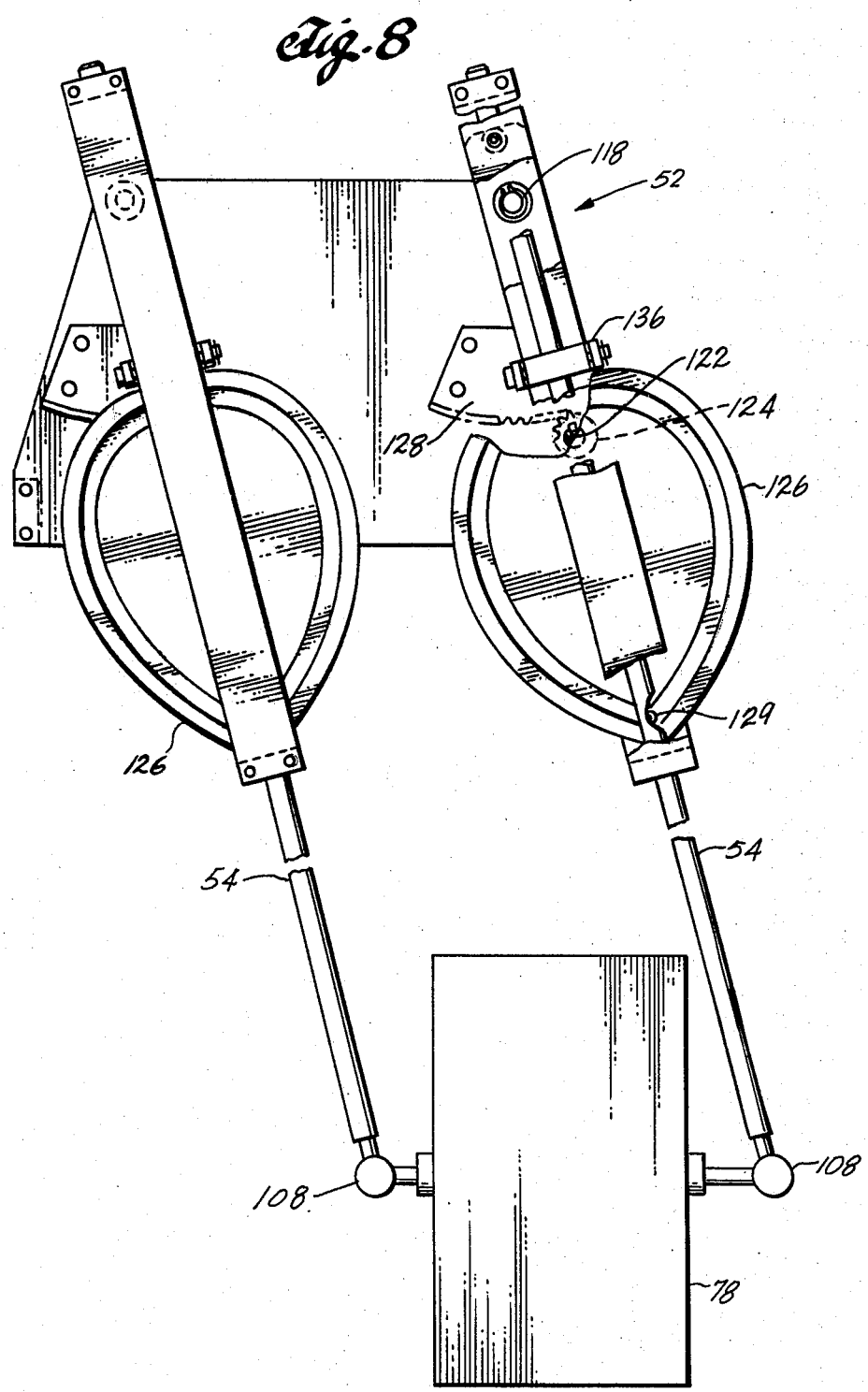

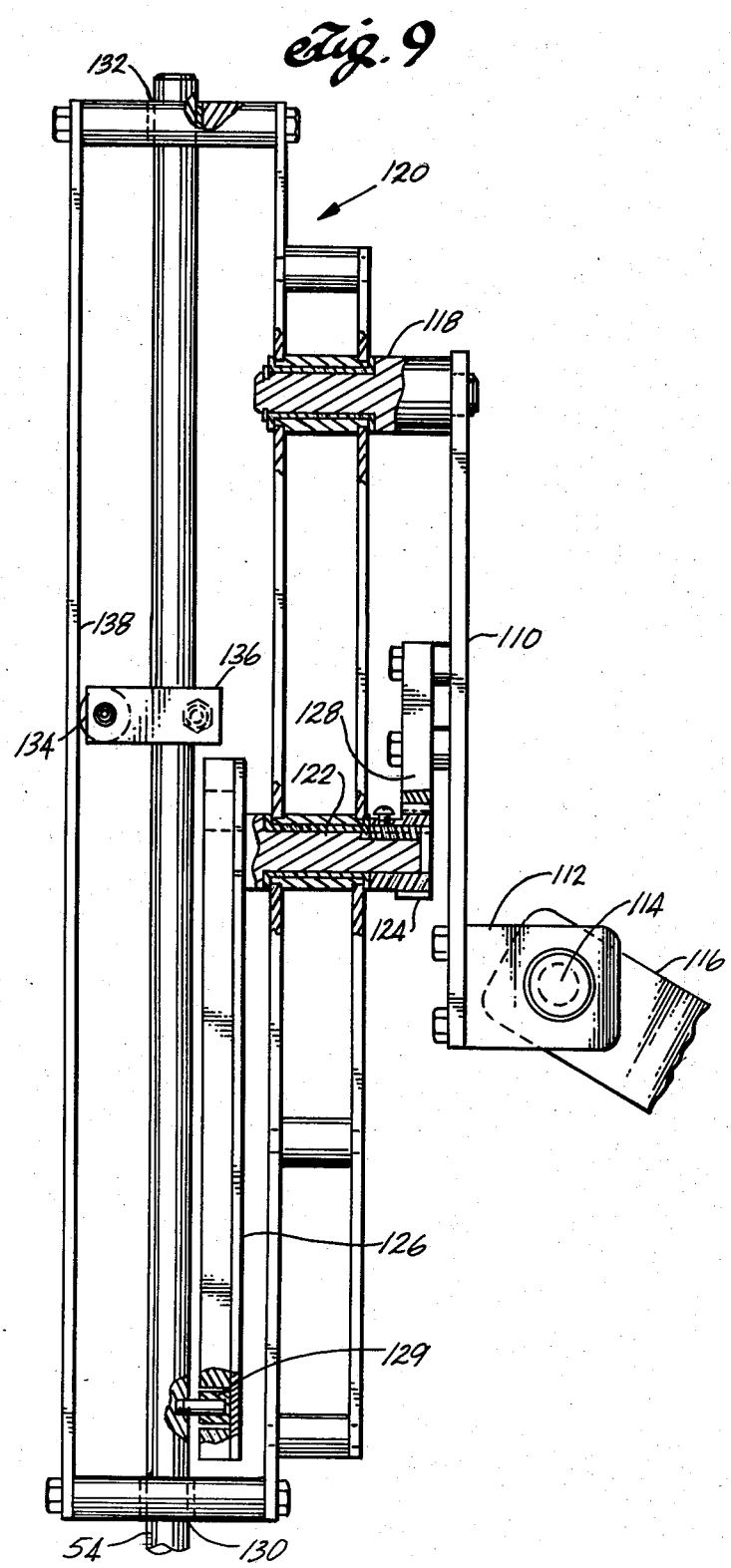

CARRIER SYSTEM FOR POSITIONING SENSORS ADJACENT A WIRE ROPE

BACKGROUND OF THE INVENTION

1. Field of the Invention

This invention relates to a carrier system for positioning sensors adjacent a wire rope for measuring longitudinal movement of the wire rope to determine depth in a well of equipment which is carried by wire rope, while avoiding errors caused by lateral movement of the wire rope.

2. The Prior Art

The accurate measurement of equipment depth in a well is of major importance, and various arrangements have been employed to effect such measurement.

Some arrangements sense the rotation of the crownwheel on the derrick and thereby provide an indication of the longitudinal movement of the wire rope which actuates the kelly and the drill stem. Such arrangements require installation and maintenance work at the top of the derrick which may be dangerous, especially in bad weather or on floating drill rigs. Such arrangements suffer the disadvantage of inaccuracies introduced by slippage of the wire rope on the crownwheel or by slippage of a mechanical wheel employed to sense movement of the crownwheel.

Another arrangement measures the rotation of the drum of the drawworks and the layers of the wire rope that are spooled on the drum to measure longitudinal movement of the wire rope. Such an arrangement is rather complex, and it is not convenient for use in well logging because well logging techniques require self contained apparatus that can be readily applied to a drilling rig and that can be moved from one drilling rig to another.

Still another arrangement measures the incremental movement of the kelly by apparatus mounted at the top of the kelly. Such an arrangement is subject to considerable vibration and shock due to the movements of the kelly. It is difficult to service, particularly during the drilling operation.

SUMMARY OF THE INVENTION

The aforesaid disadvantages are overcome in the present invention by measuring depth with sensors located adjacent a spiral wound wire rope. The sensors are mounted in a housing that can be clamped on the wire rope at any convenient location, preferably at a location between the drawworks and the derrick. The housing is supported by a suspension system that attaches to and extends from the derrick with arms having an effective length that is adjusted to compensate for errors in measurement that would be caused by lateral movement of the wire rope as it is spooled onto or off of the drum of the drawworks.

Copending Application Ser. No. 168,167 filed July 11, 1980 concurrently herewith is directed to the method and apparatus for employing the proximity sensors to determine the length and direction of movement of the wire rope.

BRIEF DESCRIPTION OF THE DRAWINGS

FIG. 4 is a side view, partially broken away, showing the sensors and their mounting bracket;

FIG. 5 is an elevation view along line 5—5 of FIG. 4;

FIG. 6 is a side view, partially broken away, of the housing for the sensors;

FIG. 7 is an end view of the housing for the sensors;

FIG. 8 illustrates the overall carrier system with the housing for the sensors and the suspension system for the housing;

FIG. 9 is a side view, partially in section, of the mechanism of the suspension system for the housing.

DESCRIPTION OF THE PREFERRED EMBODIMENTS

Figure 1:
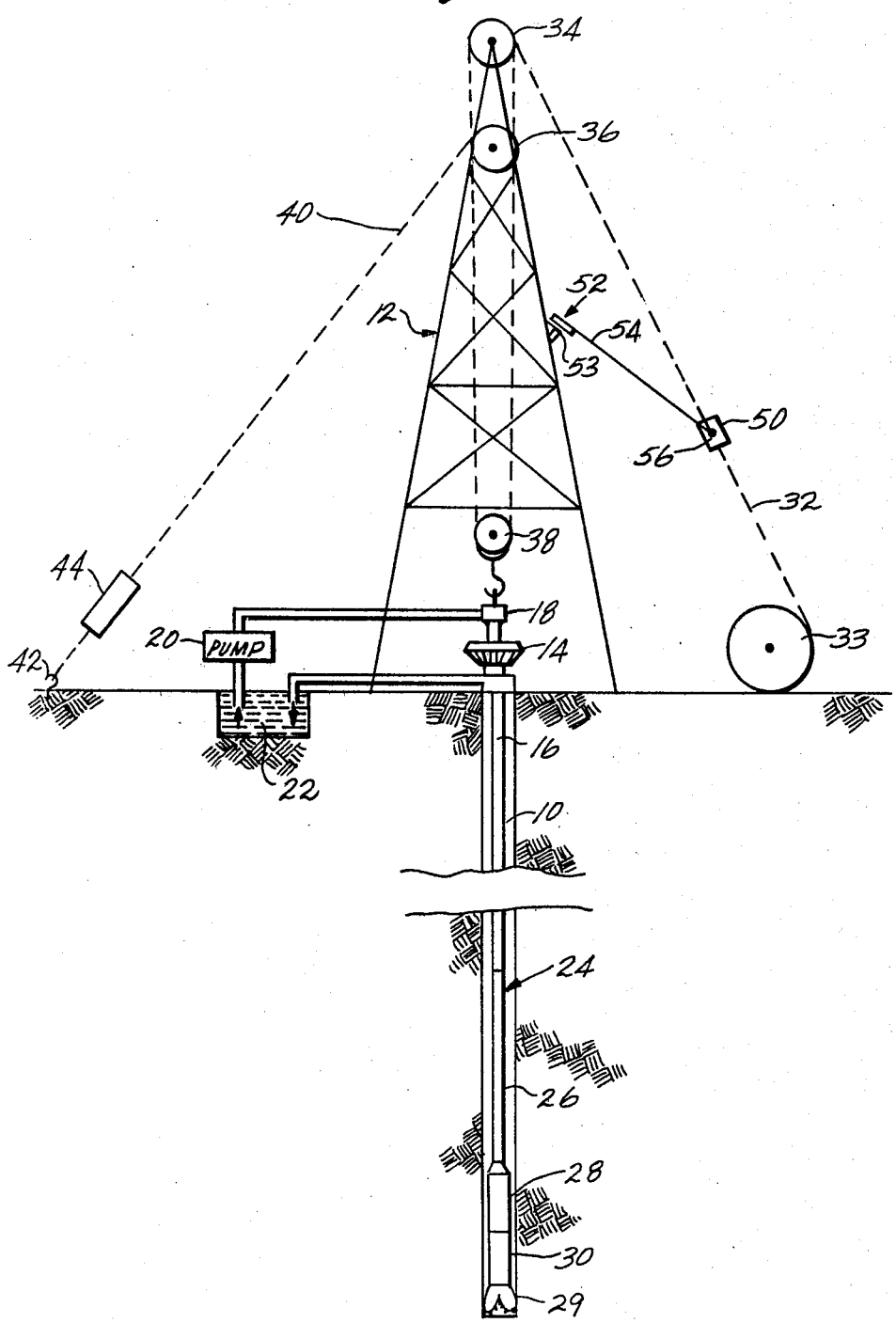
FIG. 1 illustrates a well drilling system employing the present invention.

FIG. 1 illustrates a conventional rotary well drilling system for producing a well 10 in the earth. It includes the usual derrick 12, rotary table 14, kelly 16, swivel 18, mud pump 20, mud pit 22, and a drill string 24 made up of drill pipe sections 26 secured to the lower end of the kelly 16 and to the upper end of drill collars 28 and terminating in the drill bit 29.

Well logging apparatus 30 may be incorporated in the drill string, if desired, in order to simultaneously conduct well logging while the drilling operation is under way.

The kelly and drill string are moved upwardly or downwardly by a wire rope 32 which is actuated by the drawworks 33. The wire rope passes over the crown wheel 34 to the upper block 36 and the traveling block 38 and back and then in the form of the dead line 40 to the dead line anchor 42. A tension measuring device 44 in dead line 40 enables the driller to ascertain the tension in the line, which is a measure of the hook load.

The upper block 36 and the traveling block 38 comprise several pulley sections and the wire rope passes back and forth between the two blocks to provide a desired mechanical advantage, such as 10:1.

Although the invention is described with reference to equipment which is carried by the drill string, it will be apparent that the invention may be employed to determine the depth in a well of equipment which is carried by the wire rope itself. For example, the invention may be employed with wire line logging equipment, with perforating equipment, etc. Also, the invention may be employed to measure movement of wire rope in other applications, such as in elevators or with cages in mine shafts that are supported by wire rope.

In accordance with the present invention the movement of the wire rope is measured at a location between the drawworks 33 and the derrick 12. A housing 50 clamps around the wire rope 32 at a desired location. It is supported by a suspension system 52 affixed to the derrick by a pivot 53 and having arms 54 connected to the housing 50 by ball joints 56.

The drawworks 33 has a drum which is rotated by a motor and clutch (not shown), and it accommodates layers of the wire rope that may be spooled onto the drum or off it.

Figure 2:
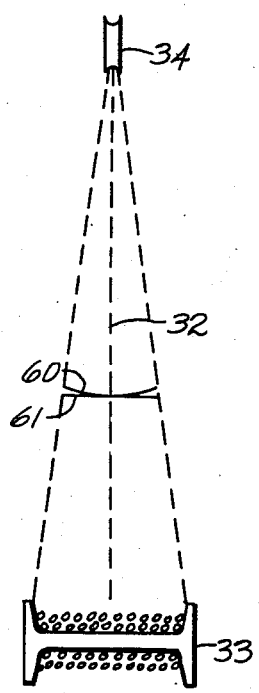
FIG. 2 illustrates the lateral movement of the wire rope along the drawworks.

FIG. 2 illustrates by the arc 60 at the location of the sensor housing the limits of the lateral movement of the wire rope 32 caused by spooling of the wire rope along the drum of the drawworks 33. The distance between the arc 60 and the line 61 is the amount of correction required in order to measure depth with accuracy. The required amount of correction decreases as the sensor housing is spaced farther from the drawworks, and in some instances the amount of correction becomes negligible and can be omitted. However, many applications require that the sensor housing be located near the drawworks and in those installations correction is desirable.

Figure 3:
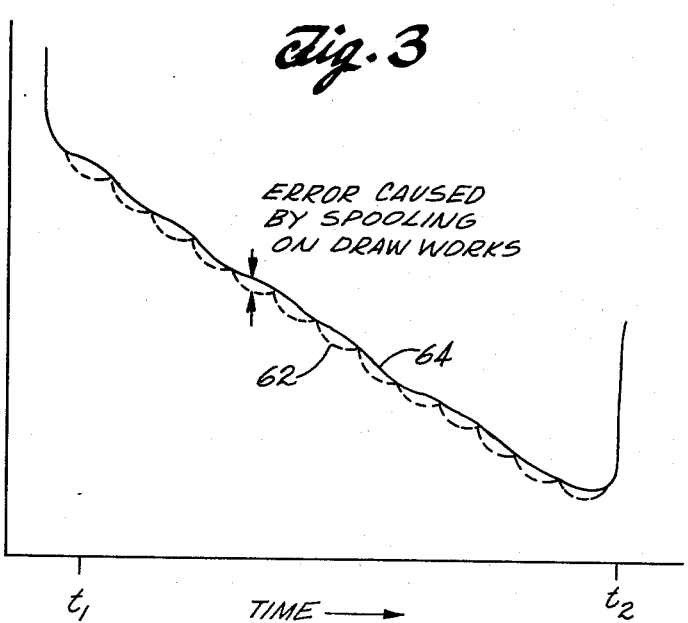
FIG. 3 illustrates the errors that would be caused by lateral movement of the wire rope along the drawworks if uncorrected.

FIG. 3 illustrates the effect of the lateral movement of the wire rope 32 upon the measurement of the longitudinal movement of the wire rope to provide a measurement of depth. Drilling, and hence logging if done while drilling, is ordinarily effected in 31 foot increments because of the length of the kelly and drill pipe. The time $t_1$ to $t_2$ illustrates the time required for one increment. The dashed curves 62 illustrate the effects on movement of the traveling block caused by lateral movement of the wire rope 32 as it is spooled from end to end of the drum of the drawworks 33.

The solid curve 64 illustrates the movement of the traveling block that would take place if there were no lateral movement of the wire rope at the drawworks. The height of the traveling block 38 indicates the depth of the drill bit 29 and well logging instruments 30 in the drill string 24 during each 31 foot increment of drilling. Thus, the failure of the dashed curves 62 to follow the solid curve 64 constitute errors in the measurement of depth based upon measurement of the longitudinal movement of the wire rope. Those errors are corrected by the action of the suspension system 52 in changing the effective length of the arms 54 to make the desired corrections.

Figure 2A:
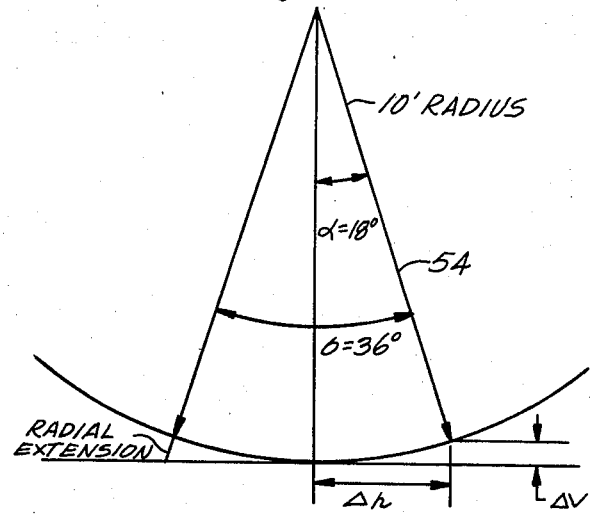
FIG. 2A shows how the effective length of the arms for supporting the housing for the sensors is adjusted to compensate for errors in measurement that would be caused by lateral movement of the wire rope along the drawworks.

FIG. 2A illustrates the amount of radial extension required to change the effective length of the arms 54 over a path defining an internal angle of 36° in an embodiment of this invention employing arms 54 having an unextended length of 10 feet and with a drawworks 6 feet wide. The maximum change in arm length is 6.175 inches for this embodiment of the invention, as shown in the following computation. The computations for 4° through 15° are omitted for brevity.

TABLE I

| Radial extension required = $\Delta V/\cos\alpha$ to meet horizontal per degree | | | $\Delta h = 10 \sin\alpha$ $\Delta V = 10 - 10\cos\alpha$ | |
|---|---|---|---|---|
| α | ft. | in. | α | $\Delta h$(ft) | $\Delta V$(ft) |
| 1° | .001002 | .012024 | 1° | .1745 | .0015 |
| 2° | .0061037 | .0732444 | 2° | .3489 | .0061 |
| 3° | .0137188 | .1646256 | 3° | .5233 | .0137 |
| . | . | . | . | . | . |
| 16° | .402908 | 4.834896 | 16° | 2.7563 | .3873 |
| 17° | .4568627 | 5.4823524 | 17° | 2.9237 | .4369 |
| 18° | .5145856 | 6.1750722 | 18° | 3.0901 | .4894 |

FIG. 4 shows three sensing elements 68, 69, 70 mounted on a bracket 72. Each sensing element is encased in a plastic cover 74 for protection and each is provided with mounting means 76 permitting adjustment with respect to the path of the wire rope.

FIGS. 6 and 7 show the housing for the sensing elements. It comprises a cylindrical shell housing 78 with a hinged portion 80 supported by a hinge 82 along one side and by latch pins 84 along the other side. The latch pins are preferably connected to the derrick by flexible lanyards 86. Upon actuation of the lanyards as a result of some malfunction in the wire rope system, the latch pins 84 will be released allowing the hinged portion 80 to open so that the sensor housing can separate from the wire rope.

The sensors must be positioned a set distance away from the surface of the wire rope for proper operation, and that distance must be maintained within a fractional portion of an inch. To meet those requirements, six bearing rollers 88 are employed at two spaced locations along the housing—three at each end of the housing. The bearing rollers 88 have plastic rollers 90 that ride against the surface of the wire rope. They are spring loaded to the housing by springs 92.

The purpose of spring-loading the bearing rollers is three-fold: first, to keep the sensor housing centralized about the cable regardless of wear on the individual bearing rollers themselves, thus maintaining proper positioning of the proximity sensors with respect to the wire rope; secondly, to provide shock and vibration dampening from the cable that would otherwise be transmitted to the sensors with possible impairment of their operation; the third purpose for spring-loading the bearing rollers is to provide a jettisoning force for ejecting the sensor housing from the cable in the event of a malfunction.

Cable restraints 94 are located at each end of the housing. Each cable restraint is mounted on struts 96, and has a pair of semicircular rings 98, 99, with the ring 98 being fixed and the ring 99 being pivoted at 100 and held in position by latch pin 102. Preferably the latches 102 are connected to the derrick by flexible lanyards 104. Upon actuation of the lanyards as a result of some malfunction in the wire rope system, the latch pins 102 will be released along with the latch pins 84 that secure hinged portion 80 of the housing so that the entire housing structure can separate from the wire rope.

The cable restraints 94 confine the wire rope to a specific area as it passes through the sensor housing. This aids tracking of the bearing rollers 88 in the event of extreme gyrations or whipping of the wire rope. The cable restraints 94 also serve to provide a controlled exit path for the wire rope in the event jettisoning of the sensing housing is necessary.

A pair of bushings 106 are provided for coupling the housing 78 to the arms 54 of the suspension system 52 through a pair of ball joints 108 (FIG. 8).

The suspension system 54 of FIGS. 8 and 9 serves to adjust the effective length of the arms 54 which support the housing 78 to compensate for errors in measurement that would be caused by lateral movement of the wire rope along the drawworks.

As illustrated in FIG. 2A, the development of the compensator mechanism is based upon the amount that the length of the arms 54 are required to extend per degree of arc caused by lateral movement of the wire rope, such that the ends that are connected to the housing 78 will maintain a horizontal path. Using the midpoint of arc travel as zero deviation, the radial extension of the arms 54 required to maintain zero deviation per degree of arc is calculated as set forth in Table I. This data provides the information required to develop a cam action for causing the arms 54 to extend the designated amount per degree of arc travel.

Figure 10:
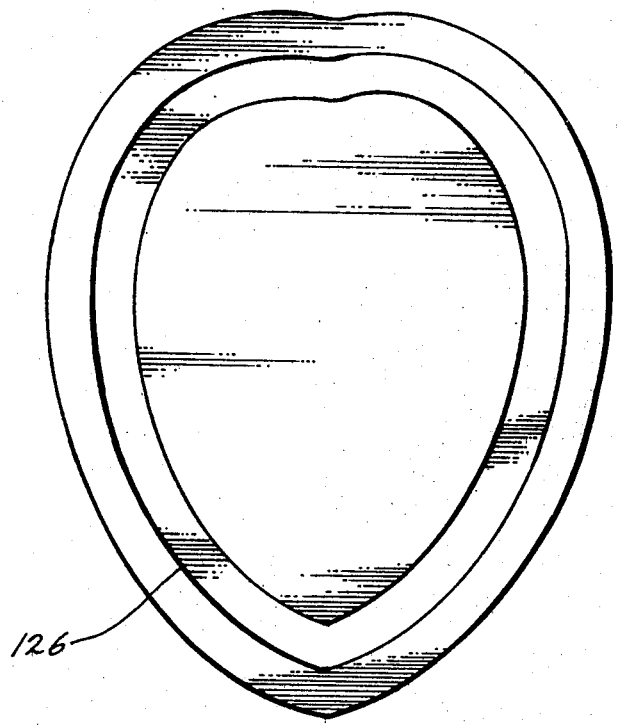
FIG. 10 is a plan view of the cam employed in the suspension system of FIG. 9.

The compensator mechanism of the suspension system 52 is disclosed in FIGS. 9 and 10.

A support arm 110 is attached to the derrick at any suitable location through a bracket 112, a pivot 114 and an arm 116 that is rigidly attached to a selected location on the derrick structure (not shown).

A fixed or primary pivot shaft 118 extends from the upper end of the support arm 110, and the compensator mechanism is suspended by the fixed primary pivot shaft 118. A main frame assembly 120 is pivoted on the shaft 118 in positions that are determined by the lateral movement of the wire rope as it passes through the housing 78 for the sensors.

A shaft 122 is pivoted in a mid-portion of the main frame. The shaft 122 carries a spur gear 124 on one end and it is rigidly affixed to a cam 126 at the other end. A fixed gear section 128 is affixed to the arm 110 in a position to engage the spur gear 124. Thus, movements of the main frame 120 caused by lateral movements of the wire rope cause the spur gear 124 to rotate along the fixed gear section 128, thereby causing rotational movements of the cam 126. The movements of the cam 126 are imparted to the arm 54 through a cam follower 129 which is inserted into the cam 126 at one end and affixed to the arm 54 at the other end. Thus, movements of the cam 126 cause corresponding movements of the arm 54. The cam 126 is shaped to provide the radial extensions of the arm 54 as calculated in FIG. 2A and Table I. It will be obvious that arms of different length or drawworks of different width will require radial extensions different from those shown in FIG. 2A and cam shapes that are different from that shown on FIG. 10.

Movements of the arm 54 are guided in bushings 130, 132 located in the ends of the mainframe 120. A roller 134 that is affixed to the arm 54 by a bracket 136 and rolls along the surface 138 of the mainframe serves to provide lateral stability for the arm when it is moved by the cam 129.

What is claimed is:

1. In a well rig having equipment that is moved upwardly or downwardly by wire rope that is supported by a derrick and moved by a drawworks having a rotatable drum, apparatus for positioning proximity sensors for determining the depth in a well of equipment supported by the wire rope comprising:
   (a) a housing for positioning the proximity sensors adjacent the wire rope having guide means at two spaced locations for engaging the wire rope at said spaced locations along the direction of movement of the wire rope, with the sensors being affixed to the housing at a position between said two spaced locations for the guide means,
   (b) a pivoted suspension system for supporting said housing extending between a selected location on the derrick and the housing for supporting the housing so that the housing in following movement of the wire rope tends to move along an arc; and
   (c) means in said suspension system responsive to lateral movement of the housing for the sensors for adjusting the length of the suspension system to cause the housing to move along a substantially horizontal path to thereby compensate for errors in measurement that would be caused by lateral movements of the wire rope from side to side of the drum caused by spooling of the wire rope on the drum.

2. The apparatus of claim 1 wherein said housing comprises a hollow cylinder with a portion of the cylinder being hinged to permit opening or closing the cylinder around the wire rope.

3. The apparatus of claim 1 wherein said guide means comprises sets of three opposed spring loaded rollers at each of said two spaced locations for engaging the wire rope and dampening vibratory movements of the wire rope.

4. The apparatus of claim 1 wherein said guide means comprises spring loaded rollers, and said housing has a hinged portion which supports part of the rollers, whereby the spring loaded rollers apply force to the hinged portion of the housing thereby causing it to spring open when released.

5. The apparatus of claim 1 wherein said suspension system includes a cam which is responsive to the movement of arms extending between the suspension system and said housing, with the cam causing the effective length of the arms to change in accordance with lateral movements of the housing and the wire rope.

6. In a well rig having equipment that is moved upwardly or downwardly by wire rope that is supported by a derrick and moved by a drawworks having a rotatable drum, apparatus for positioning sensors for determining the depth in a well of equipment supported by the wire rope comprising:
   (a) a housing having guide means for positioning the sensors adjacent the wire rope so that the wire rope can move longitudinally by the sensors,
   (b) a pivoted suspension system for supporting said housing extending between a fixed location on the derrick and the housing for supporting the housing so that the housing in following movement of the wire rope tends to move along an arc; and
   (c) means in said suspension system responsive to lateral movement of the housing for the sensors for adjusting the length of the suspension system to cause the housing to move along a substantially horizontal path to thereby compensate for errors in measurement that would be caused by lateral movements of the wire rope from side to side of the drum caused by spooling of the wire rope on the drum.

7. In a well drilling rig having equipment that is moved upwardly or downwardly by wire rope that is supported by a derrick and moved by a drawworks having a rotatable drum, apparatus for positioning proximity sensors for determining the depth in a well of equipment supported by the wire rope comprising:
   (a) a housing for positioning the proximity sensors adjacent the wire rope having roller means at two spaced locations for engaging the wire rope at said spaced locations along the direction of movement of the wire rope, with the sensors being affixed to the housing at a position between said two spaced locations for the roller means,
   (b) a pivoted suspension system for supporting said housing extending between a selected location on the derrick and the housing for supporting the housing so that the housing can follow any lateral movement of the wire rope, and
   (c) means in said suspension system responsive to lateral movement of the wire rope for compensating for errors in measurement that would be caused by the lateral movements of the wire rope from side to side of the drum caused by spooling of the wire rope on the drum.

8. Apparatus for positioning sensors adjacent a movable spiral wound wire rope comprising:

(a) a housing for positioning the sensors adjacent the wire rope having roller means at two spaced locations for engaging the wire rope at said spaced locations along the direction of movement of the wire rope, with the sensors being affixed to the housing at a position between said two spaced locations for the roller means to sense the spiral windings of the wire rope, (b) a suspension system for supporting said housing pivoted at a fixed location, and (c) means in said suspension system responsive to lateral movement of the wire rope and the housing for adjusting the length of the suspension system to nullify the effects of lateral movement of the wire rope with respect to measurement of the longitudinal movement of the wire rope.

9. In a well rig having equipment that is moved upwardly or downwardly by spiral wound wire rope that is supported by a derrick and moved by a drawworks having a rotatable drum, apparatus for positioning proximity sensors for determining the depth in a well of equipment supported by the wire rope comprising:

(a) a housing for positioning the proximity sensors adjacent the wire rope having spring-loaded roller means at two spaced locations for engaging the wire rope at said spaced locations along the direction of movement of the wire rope, with the sensors being affixed to the housing at a position between said two spaced locations for the roller means to sense the spiral windings of the wire rope, and (b) a pivoted suspension system for supporting said housing extending between a selected location on the derrick and the housing for supporting the housing so that the housing can follow any lateral movement of the wire rope.

10. Apparatus for positioning sensors adjacent a movable spiral wound wire rope comprising:

(a) a hollow cylindrical housing;

(b) two sets of three opposed spring loaded rollers located at spaced locations in the housing for engaging the wire rope and dampening vibratory movements;

(c) a plurality of sensors located between the top sets of rollers at spaced locations along the direction of movement of the wire rope to sense the movement of the spiral windings of the wire rope;

(d) means for opening the housing to receive the wire rope; and (e) means for locking the housing around the wire rope with the rollers engaging the wire rope.

11. The apparatus of claim 10 wherein the means for opening the housing is a hinged portion of the cylindrical housing.

12. The apparatus of claim 11 wherein two of said spring loaded rollers are located on the hinged portion of the housing and four of the opposing spring loaded rollers are located on the other portion of the housing, whereby the spring loaded rollers apply force to the hinged portion of the housing thereby causing it be spring open when released.

* * * * *